(12) United States Patent
Zhang et al.

(10) Patent No.: US 11,722,652 B2
(45) Date of Patent: *Aug. 8, 2023

(54) METHOD AND SYSTEM FOR MULTI-WAVELENGTH DEPTH ENCODING FOR THREE- DIMENSIONAL RANGE GEOMETRY COMPRESSION

(71) Applicant: Purdue Research Foundation, West Lafayette, IN (US)

(72) Inventors: Song Zhang, West Lafayette, IN (US); Tyler Bell, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/340,081

(22) Filed: Jun. 6, 2021

(65) Prior Publication Data

US 2021/0295565 A1 Sep. 23, 2021

Related U.S. Application Data

(63) Continuation of application No. 16/826,573, filed on Mar. 23, 2020, now Pat. No. 11,050,995, which is a (Continued)

(51) Int. Cl.
*H04N 13/139* (2018.01)
*H04N 13/254* (2018.01)
(Continued)

(52) U.S. Cl.
CPC ....... *H04N 13/161* (2018.05); *G01B 11/2513* (2013.01); *H04N 13/139* (2018.05);
(Continued)

(58) Field of Classification Search
CPC ............................. H04N 13/161; H04N 13/15
See application file for complete search history.

(56) References Cited

U.S. PATENT DOCUMENTS 6,246,796 B1 *  6/2001  Horikoshi ............ G03H 1/2294
                                                  375/E7.184
6,788,210 B1 *  9/2004  Huang .................... G06T 17/10
                                                  340/612
(Continued)

*Primary Examiner* — Irfan Habib
(74) *Attorney, Agent, or Firm* — Purdue Research Foundation

(57) ABSTRACT

A method for generating encoded depth data includes receiving digital fringe projection (DFP) data corresponding to a three-dimensional structure of a physical object, and generating first and second fringe encodings for a first predetermined wavelength based on the DFP data at a first coordinate. The method further includes generating third and fourth fringe encodings for a second predetermined wavelength based on the DFP data at the first coordinate, the second wavelength being longer than the first wavelength, and generating a combined fringe encoding based on the third fringe encoding and the fourth fringe encoding. The method further includes storing the first, second, and combined fringe encoding data in a pixel of two-dimensional image data at a pixel coordinate in the two-dimensional image data corresponding to the first coordinate.

20 Claims, 7 Drawing Sheets

Related U.S. Application Data continuation of application No. 15/367,221, filed on Dec. 2, 2016, now Pat. No. 10,602,118.

(60) Provisional application No. 62/261,932, filed on Dec. 2, 2015.

(51) Int. Cl.
 *G01B 11/25* (2006.01)
 *H04N 13/161* (2018.01)
 *H04N 13/15* (2018.01)
 *H04N 19/625* (2014.01)

(52) U.S. Cl.
 CPC ........... *H04N 13/15* (2018.05); *H04N 13/254* (2018.05); *H04N 19/625* (2014.11)

(56) References Cited

U.S. PATENT DOCUMENTS

| | | | | |
|---|---|---|---|---|
| 8,090,194 B2 * | 1/2012 | Golrdon | ............... | G06V 10/147 |
| | | | | 382/154 |
| 8,538,166 B2 * | 9/2013 | Gordon | ................. | G01B 11/25 |
| | | | | 382/201 |
| 8,929,644 B2 * | 1/2015 | Zhang | ................ | G01B 11/2513 |
| | | | | 382/154 |
| 9,219,905 B1 * | 12/2015 | Georges, III | ........ | H04N 19/154 |
| 9,239,274 B2 * | 1/2016 | Joly | .................... | G01M 17/027 |
| 9,557,856 B2 * | 1/2017 | Send | ......................... | G06T 7/73 |
| 9,562,760 B2 * | 2/2017 | Braker | ................... | G01S 17/42 |
| 10,094,927 B2 * | 10/2018 | Send | ......................... | G01S 7/51 |
| 10,110,879 B2 * | 10/2018 | Tian | ..................... | H04N 13/236 |
| 10,120,078 B2 * | 11/2018 | Bruder | .................... | G01S 17/89 |
| 10,571,668 B2 * | 2/2020 | Braker | .................... | G02B 13/16 |
| 10,699,429 B2 * | 6/2020 | Liu | ........................ | G06T 7/73 |
| 2006/0072122 A1 * | 4/2006 | Hu | ......................... | G06T 7/521 |
| | | | | 356/603 |
| 2007/0115484 A1 * | 5/2007 | Huang | ............... | G01B 11/2527 |
| | | | | 356/604 |
| 2007/0279639 A1 * | 12/2007 | Hu | ........................ | G01B 11/25 |
| | | | | 356/512 |
| 2009/0238449 A1 * | 9/2009 | Zhang | ..................... | G06T 7/521 |
| | | | | 382/165 |
| 2011/0080471 A1 * | 4/2011 | Song | ....................... | G06T 7/521 |
| | | | | 356/627 |
| 2011/0298891 A1 * | 12/2011 | Zhang | ................ | G01B 11/2509 |
| | | | | 348/51 |
| 2013/0236066 A1 * | 9/2013 | Shubinsky | ............... | H04N 5/33 |
| | | | | 382/115 |
| 2014/0063024 A1 * | 3/2014 | Zhang | ..................... | G06T 9/001 |
| | | | | 345/506 |
| 2014/0066509 A1 * | 3/2014 | Manku | ................... | A61Q 19/08 |
| | | | | 514/560 |
| 2014/0078264 A1 * | 3/2014 | Zhang | ..................... | H04N 9/31 |
| | | | | 348/47 |
| 2015/0286340 A1 * | 10/2015 | Send | ....................... | G01B 11/25 |
| | | | | 250/206.1 |
| 2017/0132489 A1 * | 5/2017 | Simgi | ..................... | G06Q 10/10 |
| 2017/0254642 A1 * | 9/2017 | Ume | .................. | G01B 11/2518 |
| 2019/0394489 A1 * | 12/2019 | Zhang | ................. | H04N 13/261 |

\* cited by examiner

US 11,722,652 B2

METHOD AND SYSTEM FOR MULTI-WAVELENGTH DEPTH ENCODING FOR THREE-DIMENSIONAL RANGE GEOMETRY COMPRESSION

This application is a continuation of U.S. patent application Ser. No. 16/826,573, filed Mar. 23, 2020.

CLAIM OF PRIORITY

This application claims priority to U.S. Provisional Application No. 62/261,932, which is entitled "Multi-Wavelength Depth Encoding Method for 3D Range Geometry Compression," and was filed on Dec. 2, 2015, the entire contents of which are hereby incorporated herein by reference.

GOVERNMENT INTEREST

This invention was made with government support under CMMI-1300376 awarded by the National Science Foundation. The government has certain rights in the invention.

TECHNICAL FIELD

This disclosure relates generally to the field of image processing and, more specifically, to methods and systems for encoding and decoding geometry data corresponding to physical objects in three-dimensional imaging.

BACKGROUND

Recent advances in 3D scanning technologies have brought about the capabilities to capture high-quality data at very fast speeds. Given such progress, one might consider these technologies to be on the brink of widespread dissemination. One inherent problem that must be further addressed, however, is establishing methods for 3D range data compression that are robust and offer high compression ratios; such methods will ensure efficient storage and fast, high-quality data recovery.

Currently, one conventional storage standard for a single frame of 3D geometry is the mesh format. These formats (e.g. OBJ, PLY, STL) are generic in nature and perform their tasks well, storing the coordinates of each vertex often along with connectivity information. Additional information can also be stored with the mesh such as a surface normal map and a (u, v) map. Although these formats are able to perform their task of representing a frame of 3D geometry, they also require a large amount of storage to do so. For example, a single 640×480 frame of 3D geometry, with only vertex locations and connectivity information, needs about 13 MB of space. For real-time or faster 3D capture systems that want to store or stream each single frame, this large file size becomes an issue.

Given this, other 3D range data compression techniques have been proposed. One such methodology is to encode the raw 3D data in some way such that it can be represented within a 2D image. The information stored within an image's color channels can then be used to recover and reconstruct the compressed geometry. Such approaches are able to take advantage of very well established image formats (e.g., PNG) and the infrastructure built around them.

To compress 3D geometry into a 2D image, one approach is to use the principles of virtual digital fringe projection (DFP). Using the conventions of DFP along with a virtual structured light scanner, this HoloImage approach projects fringe images upon the virtual 3D geometry and captures them virtually. The resulting captured fringe images are then packed into the image (e.g., into its color channels) along with any information that may be required to unwrap the phase map between the phase images (e.g., stair image). An additional advantage to using a virtual fringe projection system which converts raw 3D geometry into a 2D image frame is its portability to video storage and streaming.

While digital fringe projection techniques that are known to the art can be useful for generation of the representations of some three-dimensional structures based on 2D images, the existing DFP techniques still have noticeable problems with common lossy image compression algorithms such as JPEG compression. While lossy compression algorithms by their very nature introduce some errors into compressed images, the artifacts that present little or no image quality degradation in traditional compressed photographs often introduce unacceptably large errors when applied to two-dimensional images that contain encoded DFP data. This makes recording of high-resolution features of three-dimensional objects difficult because the common and highly effective lossy compression algorithms often produce errors that render high-resolution DFP data unusable in practical systems. Consequently, improvements to processes for encoding and decoding DFP data that improve the quality of the DFP for high-resolution details of an object and that maintain high quality even when heavily compressed would be beneficial to the art.

SUMMARY

This disclosure presents a novel method for representing three-dimensional (3D) range data within regular two-dimensional (2D) images using multi-wavelength encoding. These 2D images can then be further compressed using traditional lossless (e.g., PNG) or lossy (e.g., JPEG) image compression techniques. Current 3D range data compression methods require significant filtering to reduce lossy compression artifacts. The nature of the proposed encoding, however, offers a significant level of robustness to such artifacts brought about by high levels of JPEG compression. This enables extremely high compression ratios while maintaining a very low reconstruction error percentage with little to no filtering required to remove compression artifacts. For example, when encoding 3D geometry with the proposed method and storing the resulting 2D image using a commercially available JPEG image compression engine, compression ratios of approximately 935:1 versus the OBJ format can be achieved at an error rate of approximately 0.027% without any filtering.

In one embodiment, a computer readable medium contains computer instructions that, when executed by processor, are configured to generate encoded depth map data for a physical object based on digital fringe projection (DFP) data has been developed. This includes, receiving, with a processor, digital fringe projection data corresponding to a three-dimensional structure of a physical object, generating, with the processor, a first fringe encoding and a second fringe encoding for a first predetermined wavelength based on the DFP data at a first coordinate, generating, with the processor, a third fringe encoding and a fourth fringe encoding for a second wavelength based on the DFP data at the first coordinate, the second wavelength being longer than the first wavelength, generating, with the processor, a combined fringe encoding based on the third fringe encoding and the fourth fringe encoding, and storing, with the processor, the first fringe encoding data, the second fringe encoding data, and the combined fringe encoding data in a pixel of two-dimensional image data at a pixel coordinate in the two-dimensional image data corresponding to the first coordinate, the two-dimensional image data being stored in a memory.

In another embodiment, a computer readable medium contains computer instructions that, when executed by processor are configured to perform a method for decoding depth map data for a physical object from encoded depth map data that correspond to DFP data for the physical object has been developed. The method includes retrieving, with a processor, a first pixel of two-dimensional image data from a memory, decoding, with the processor, dense phase data stored in the first pixel, decoding, with the processor, wrapped phase data stored in the first pixel, generating, with the processor, a stair image including a second pixel corresponding to the first pixel of the two-dimensional image data based on the dense phase data and the wrapped phase data, and generating, with the processor, a depth map including a third pixel corresponding to the second pixel of the stair image, the third pixel storing data corresponding to a depth of a location of the physical object.

In another embodiment, a system configured to generate encoded depth map data for a physical object based on DFP data has been developed. The system includes a memory and a processor operatively connected to the memory. The processor is configured to receive digital fringe projection (DFP) data corresponding to a three-dimensional structure of a physical object, generate with the processor, a first fringe encoding and a second fringe encoding for a first predetermined wavelength based on the DFP data at a first coordinate, generate a third fringe encoding and a fourth fringe encoding for a second wavelength based on the DFP data at the first coordinate, the second wavelength being longer than the first wavelength, generate a combined fringe encoding based on the third fringe encoding and the fourth fringe encoding; and store the first fringe encoding data, the second fringe encoding data, and the combined fringe encoding data in a pixel of two-dimensional image data at a pixel coordinate in the two-dimensional image data corresponding to the first coordinate, the two-dimensional image data being stored in the memory.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

Figure 1:
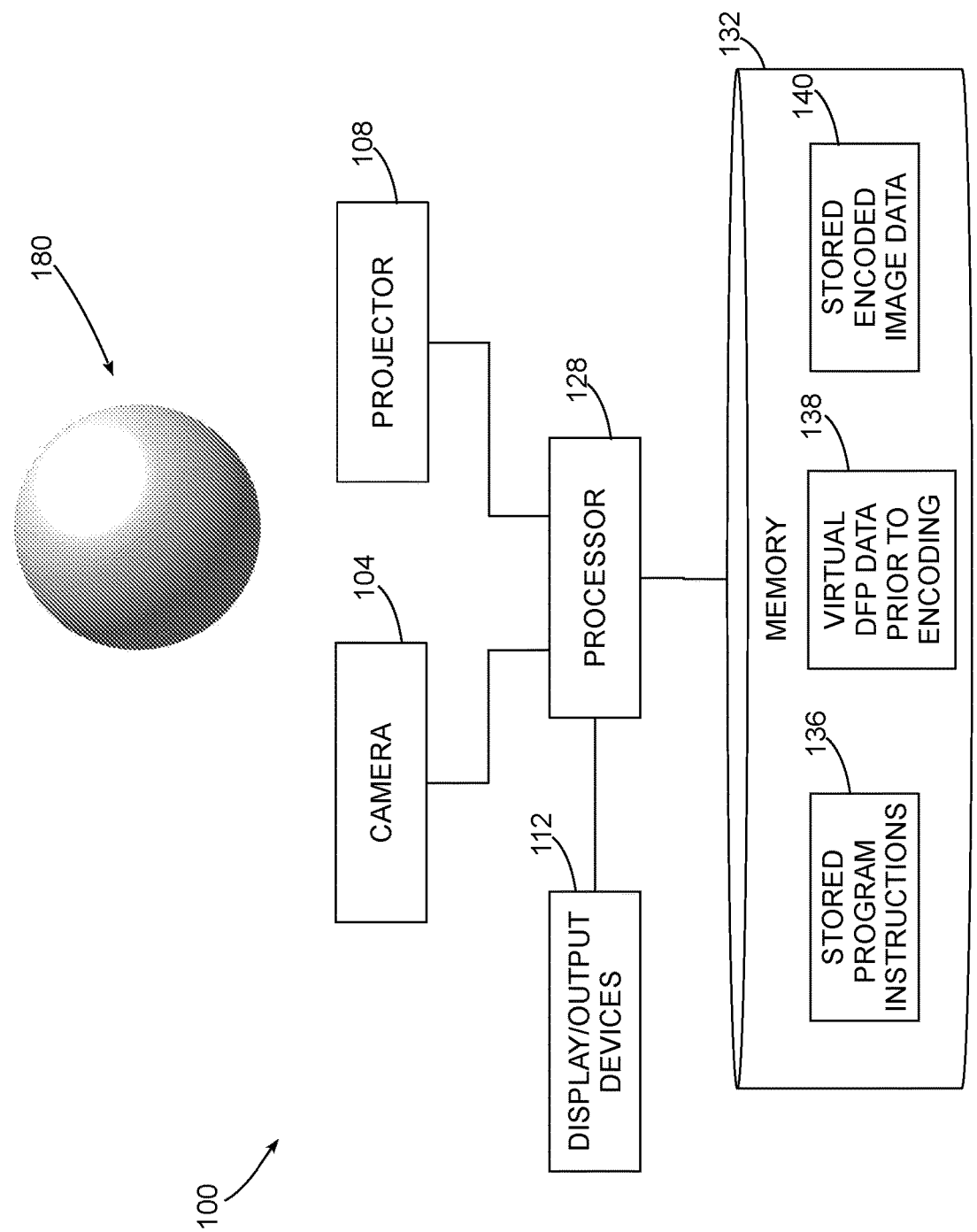
FIG. 1 is a schematic diagram of a system that generates virtual digital fringe projection (DFP) data corresponding to the three-dimensional structure of a physical object.
Figure 3:
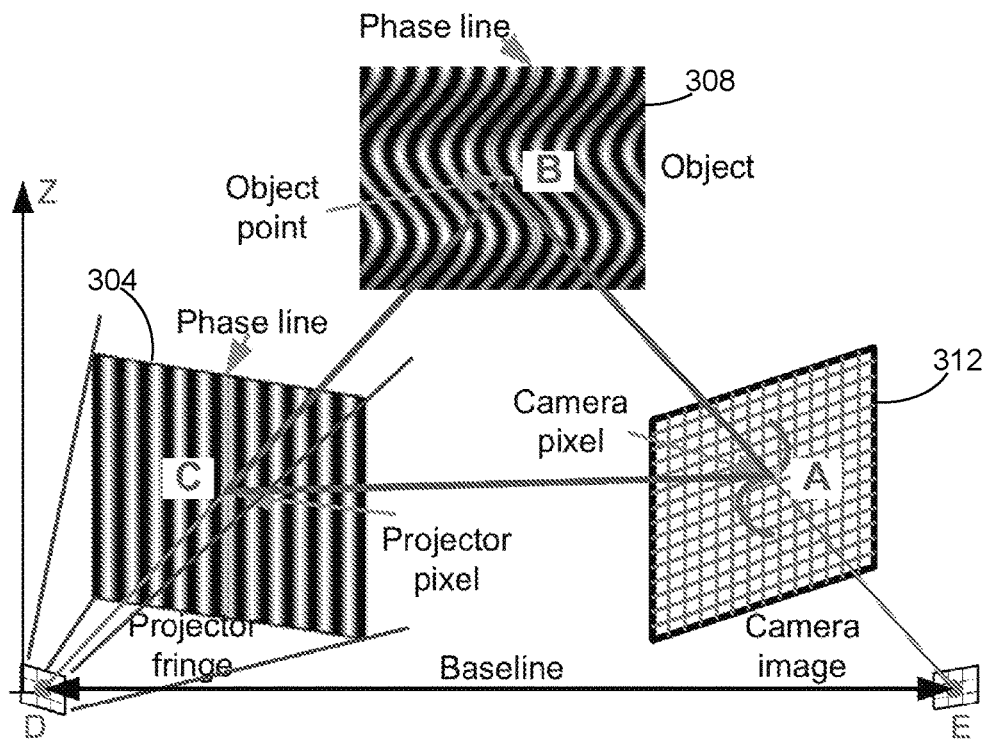
FIG. 3 is a diagram depicting a process for recording reflections of structured sinusoidal light patterns that are projected onto the surface of an object.

FIG. 1 depicts a system 100 that generates depth data for an object using a digital fringe projection (DFP) process. The system 100 includes a camera 104, a projector 108, a display or other output device 112, a processor 128, and a memory 132. In the illustrative example of FIG. 1, the system 100 generates imaging data of an object 180 including a digital fringe projection (DFP) representation of the object 180. The camera 104 is, for example, a digital camera that captures light reflected from the surface of the object 180 at a plurality of wavelengths including for example, all or a portion of the visible light spectrum, infrared, and ultraviolet frequency ranges. The projector 180 generates a series of specifically configured light patterns that are projected onto the surface of the object 180. The light patterns include, for example, a series of predetermined fringe patterns that correspond to alternating regions of high intensity and low intensity light in a sinusoidal pattern. The predetermined light pattern is also referred to as a "structured" light pattern. The object 180 reflects the predetermined phase pattern of light, and the three-dimensional structure of the object 180 affects how the phase pattern reflects and is captured by the camera 104. FIG. 3 depicts a sinusoidal phase pattern 304 that a projector, such as the projector 108 of FIG. 1, projects onto the surface of an object. In FIG. 3 the structure of the object affects the reflected light from the phase pattern 308. The camera 104 generates a digital image 312 of the reflection of the structured light, which is also referred to as a "digital fringe pattern".

In the system 100, the processor 128 is, for example, a digital processing device including one or more central processing unit (CPU) and optionally one or more graphics processing unit (GPU) cores, a digital signal processor (DSP), field programmable gate array (FPGA), or application specific integrated circuit (ASIC) that implement an image processing system. In particular, the processor 128 is configured to generate two-dimensional image data with encoded virtual digital fringe projection (DFP) data that correspond to the three-dimensional structure of an object, such as the object 180 of FIG. 1. The processor 128 or another digital processing device is further configured to decode the encoded DFP data to enable the system 100 or another computing device to analyze the structure of the object 180 or other physical objects with structural information that is encoded using the systems and methods described herein.

In the system 100 the memory 132 further includes one or more digital data storage devices including, for example, a non-volatile data storage devices such as a magnetic, optical, or solid state drive and volatile memory including static or dynamic random access memory (RAM), and the digital storage devices in the memory 132 form a non-transitory computer readable medium. In the system 100, the memory 132 holds stored program instructions 136 that enable the system 100 to generate DFP data, encode the DFP data as two-dimensional image data, and decode the two-dimensional image data to retrieve three-dimensional structural information about the object 180. The memory 132 also stores virtual DFP data as digital data 138 that is generated based on a set of data that the camera 104 generates for multiple images that correspond to reflections of the structured light patterns from the surface of the object 180 as the projector 108 emits the structured light patterns with different phases during operation of the system 100. Virtual DFP data is further generated based on a limited set of recorded images of the structured light in different phases (e.g. three images for three phases) that the processor 128 or another processor generates using a predetermined model with a "virtual" version of the camera 104 and projector 108 in a virtual three-dimensional environment. The virtual DFP technique reduces the number of structured light images that need to be encoded to produce a depth map, and the generation of the virtual DFP data prior to the encoding and decoding techniques that are discussed below is otherwise known to the art. The memory 132 further stores encoded image data 140 that includes two-dimensional images with encoded depth information based on the DFP data 138. The encoded image data 140 are optionally compressed using prior-art two-dimensional image compression techniques including both lossy and lossless compression techniques.

In the system 100, the display or output devices 112 include, for example, two-dimensional or three-dimensional display devices that produce an output corresponding to DFP data that the system 100 generates based on various physical objects including the object 180. In another configuration, the output device 112 is, for example, a network interface device that transmits encoded DFP data from the system 100 to external computing devices with the data being compressed to provide high quality DFP models that consume fewer storage and network bandwidth resources than prior art DFP encoding techniques with comparable quality. The external computing devices then decode the DFP data for a wide range of applications including, but not limited to, computer aided design and modeling (CAD/CAM) applications, building and vehicle inspections, forensic sciences, entertainment, 3D telecommunications, virtual and augmented reality applications, and the like.

During operation, the system 100 generates three-dimensional information about the object 180 using a phase-shifting technique based on the predetermined structure of the light that the projector 108 emits and the recorded reflected light that the camera 104 captures during operation of the system 100. The projector 108 translates the structured light image across the surface of the object 180 to enable the camera 104 to generate a series of digital fringe pattern images with a different phase for the structured light for a given location of the object in each image. For example, a single location on the object 180 receives the peak of sinusoid for the structured light in one phase, and a trough of the sinusoid for the light in another phase. For example, in one embodiment the system 100 generates three different phase-shifted images with predetermined phase shifts (e.g. $2\pi/3$ radians between each phase), although alternative configurations can employ a different number of phases and phase offsets.

The processor 128 generates a two-dimensional phase map that encodes three-dimensional information about the object 180, including the depth of different locations on the object 180 as a distance from the camera 104, based on the predetermined locations of the camera 104, projector 108, and the object 180 in addition to the predetermined structured light patterns that the system 100 projects onto the object 180 and the reflected light that the camera 104 receives from the object 180. The captured data is also referred to as a virtual digital fringe projection process because the processor 128 generates the three-dimensional information corresponding to the shape of the object 180 based on a virtual software model using only the series of two-dimensional images generated by the camera 104 for the reflected light from the object 180 from the structured light patterns in the predetermined phases. The imaging system 100 stores the three-dimensional position data for each location identified on the object 180 as a two-dimensional image that includes a two-dimensional array of pixels. To represent three-dimensions in a two-dimensional image, two axes (x and y) for each location on an object are encoded based on the location of a corresponding pixel in the two-dimensional image. The depth dimension (z) is encoded in the data contents of the pixel itself. For a digital fringe image, the depth is not merely a simple scalar value but a combination of phase information for the multiple structured light phases.

While certain techniques for generation of DFP data representing depth information for a three-dimensional object are known to the art, the system 100 is configured to generate an encoding for the fringe images from the DFP process with a multi-wavelength encoding process and a corresponding decoding process that are not known to the art. The system 100 enables storage of the encoded data to encode the three-dimensional depth information about an object, such as the object 180, in a two-dimensional set of image data with a higher level of quality for a given size of data required to encode the depth information compared to prior art systems.

Figure 2A:
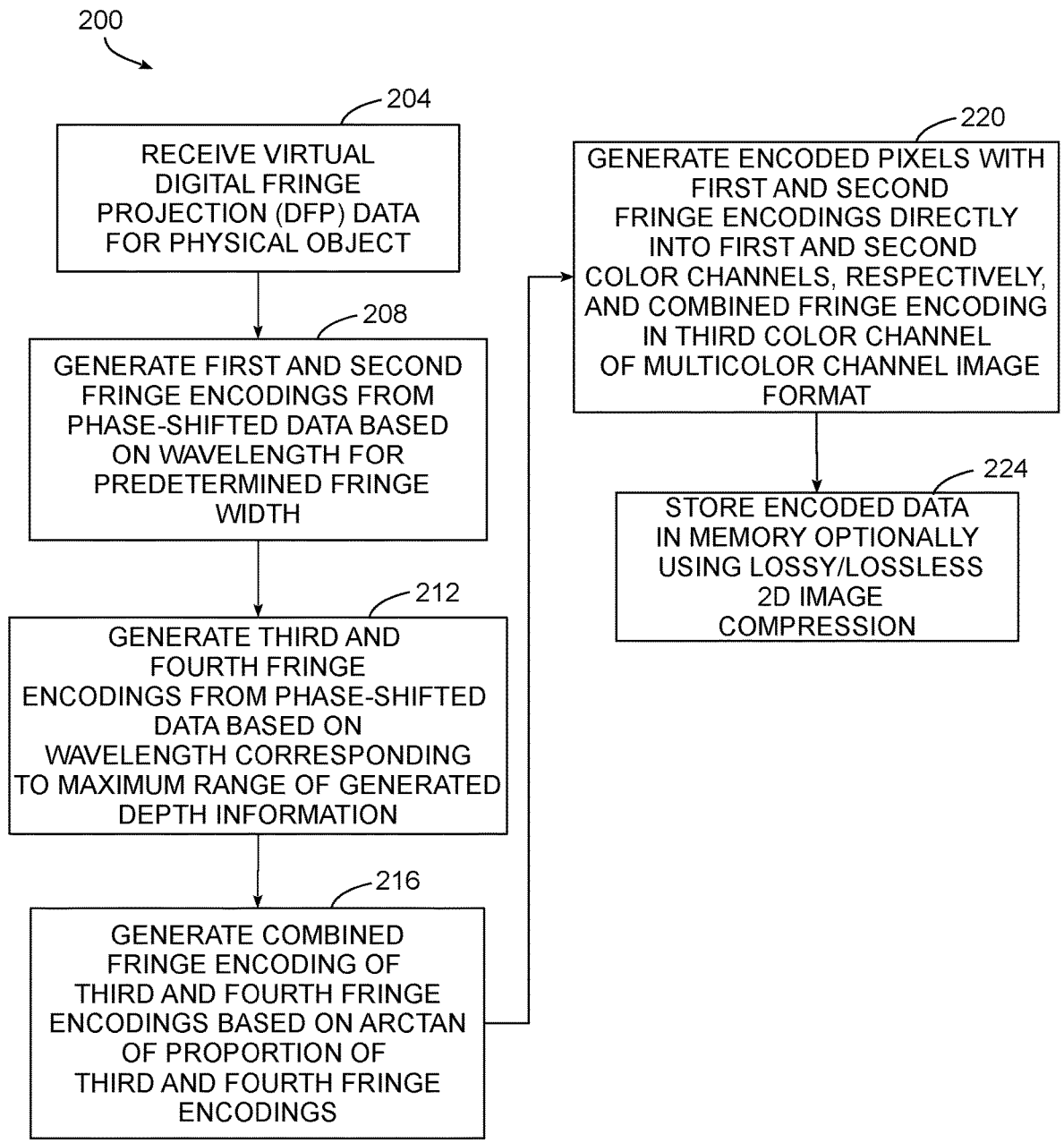
FIG. 2A is a block diagram of a process for multi-wavelength encoding of DFP data into a two-dimensional image data format.

FIG. 2A depicts a process 200 for multi-wavelength encoding of depth information data that are generated in a digital fringe projection process. In the description of process 200, a reference to the process performing a function or task refers to the execution of stored program instructions by a processor in an image processing system to perform the function or action. The process 200 is described in conjunction with the system 100 of FIG. 1 for illustrative purposes.

Process 200 begins as the processor 128 receives virtual digital fringe projection (DFP) data that are generated for a physical object (block 204). As described above, the system 100 or another suitable digital imaging system generates the DFP data. In the system 100, the processor 128 retrieves the virtual DFP data 138 from the memory 132, although in alternative embodiments a processor receives the DFP data via a data network or other communication channel. As described above, the DFP data include a two-dimensional array of elements that correspond to image data that the camera 104 generates in response to receiving reflected structured light patterns from the surface of the object 180.

The process 200 continues as the processor 128 generates first and second fringe encodings based on the DFP data at a predetermined wavelength P corresponding to a predetermined fringe width (block 208). In one configuration, the selected wavelength is set as a fraction (e.g. ¼ or ⅕) of a maximum wavelength that is included in the DFP data, where the term "wavelength" here refers to the widths of the fringes that are included in the DFP data. More generally, the first wavelength P is selected to be shorter than the maximum wavelength in the DFP data. The maximum wavelength in a two-dimensional depth map Z corresponds to a full range of depths in the DFP data corresponding to the change in depth in the structure of the object 180. For example, in FIG. 1 if the closest point on the object 180 is at a distance of 10 cm from the camera 104 and the farthest point is at a distance of 20 cm, then the maximum range of Z and corresponding maximum wavelength is 20 cm-10 cm=10 cm for the object 180. In the system 100, the processor 128 generates two encodings for the DFP data based on sine and cosine functions as is set forth below:

$$I_r(i, j) = 0.5\left[1.0 + \sin\left(\frac{2\pi \times Z(i, j)}{P}\right)\right]$$

$$I_b(i, j) = 0.5\left[1.0 + \cos\left(\frac{2\pi \times Z(i, j)}{P}\right)\right]$$

In the equations listed above, i and j represent coordinates for one set of phase data in a two-dimensional arrangement of the DFP data, and the processor 128 generates the sine and cosine encodings for each coordinate in the DFP data. Z represents a two-dimensional array of the DFP data prior to encoding, such as the DFP data 138 stored in the memory 132 of the system 100. In the embodiment of FIG. 2A the two-dimensional image format encodes a two-dimensional array of pixels where each pixel includes numeric data corresponding to three different color channels, with red, green, and blue (RGB) color channels being one common structure in many existing two-dimensional image data formats. The processor 128 places each encoded value $I_r$ in the red color channel of a pixel in a two-dimensional RGB encoded image and each $I_b$ encoded value in the blue color channel of the corresponding pixel of the RGB formatted image. However, alternative embodiments of the process 200 can store the encoded data in different arrangements of the color channels and other consistent selections of color channels are compatible with different embodiments of the process 200.

The process 200 continues as the processor 128 generates third and fourth fringe encodings for the DFP data (block 212). The third and fourth encodings are based on the longest wavelength Z and the range of wavelengths in the DFP data, which is referred to as Range(Z), which represents the difference between the largest and smallest values within the DFP data Z. During the process 200 the third encoding is based on a sine function and the fourth encoding is based on a cosine function. The processor 128 generates the third and fourth encodings based on the following functions:

$$I_g^{sin}(i, j) = 0.5[1.0 + \sin(2\pi\left(\frac{\text{Mod}(Z(i, j), \text{Range}(Z))}{\text{Range}(Z)}\right)]$$

$$I_g^{cos}(i, j) = 0.5[1.0 + \cos(2\pi\left(\frac{\text{Mod}(Z(i, j), \text{Range}(Z))}{\text{Range}(Z)}\right)]$$

In the equations above, the sine and cosine encodings $I_g^{sin}$ and $I_g^{cos}$ each generate encoded data for a pixel in a two-dimensional array of image data that corresponds to the individual DFP data element at coordinates (i, j). The Mod function refers to a numeric modulo operation. To store the different third and fourth encoding values in a single color channel of a two-dimensional image format, the processor 128 generates a combined encoding value based on the third and fourth encoded values (block 216). In the embodiment of FIG. 2A, the processor 128 generates the combined encoding value based on the following function:

$$\phi_g(i, j) = \tan^{-1}\left(\frac{I_g^{sin}(i, j) - 0.5}{I_g^{cos}(i, j) - 0.5}\right)$$

The function $\phi_g(i, j)$ generates values in a numeric range of ($-\pi$, $\pi$], which may not be compatible with the numeric encoding conventions of some two-dimensional image formats. The processor 128 normalizes the numeric range of the results from $\phi_g(i, j)$ to another numeric range, such as (0, 1], for a color channel of a two-dimensional image format using the following function:

$$I_g(i, j) = \frac{\phi_g(i, j) + \pi}{2\pi}$$

During the process 200, the processor 128 generates encoded pixels in the two-dimensional image corresponding to each coordinate (i, j) in the DFP data using the three color channels of each pixel in the two-dimensional image to store the three encoded values corresponding to the first encoded value, the second encoded value, and the combination of the third and fourth encoded values (block 220). As described, above, the process 200 is referred to as a multi-wavelength DFP encoding process because the first and second fringe encodings are generated based on the shorter wavelength P while the combined fringe encoding data are generated based on the longer wavelength Z. Thus, the process 200 generates a two-dimensional image in which the depth information for the DFP data at a particular location on an object are encoded based on the multiple wavelengths in multiple color channels of a pixel in a two-dimensional image. In the system 100, the processor 128 performs the operations described above with reference to blocks 208-220 to generate the encoded values for the color channels in the two-dimensional image in any order or concurrently.

During the process 200, the processor 128 optionally compresses the two-dimensional encoded image data using a lossy or lossless compression process (block 224). For example, in one configuration the processor 128 uses a JPEG compression process that compresses the two-dimensional image data into a lossy compression format that reduces the accuracy of the compressed image to some degree with the benefit of greatly reducing the size of the stored two-dimensional data. In another configuration, the processor 128 applies a lossless compression process to generate a lossless compressed image format using, for example, the portable network graphics (PNG) format. The lossless compression process retains all of the information from the originally encoded information but in some instances the lossless compression process produces a compressed image that requires more memory storage capacity than the lossy compression formats. The processor 128 stores the encoded and optionally compressed image data 140 in the memory 132. In some embodiments, the processor 128 transmits the encoded data to another computing system using a network interface device 112.

Figure 2B:
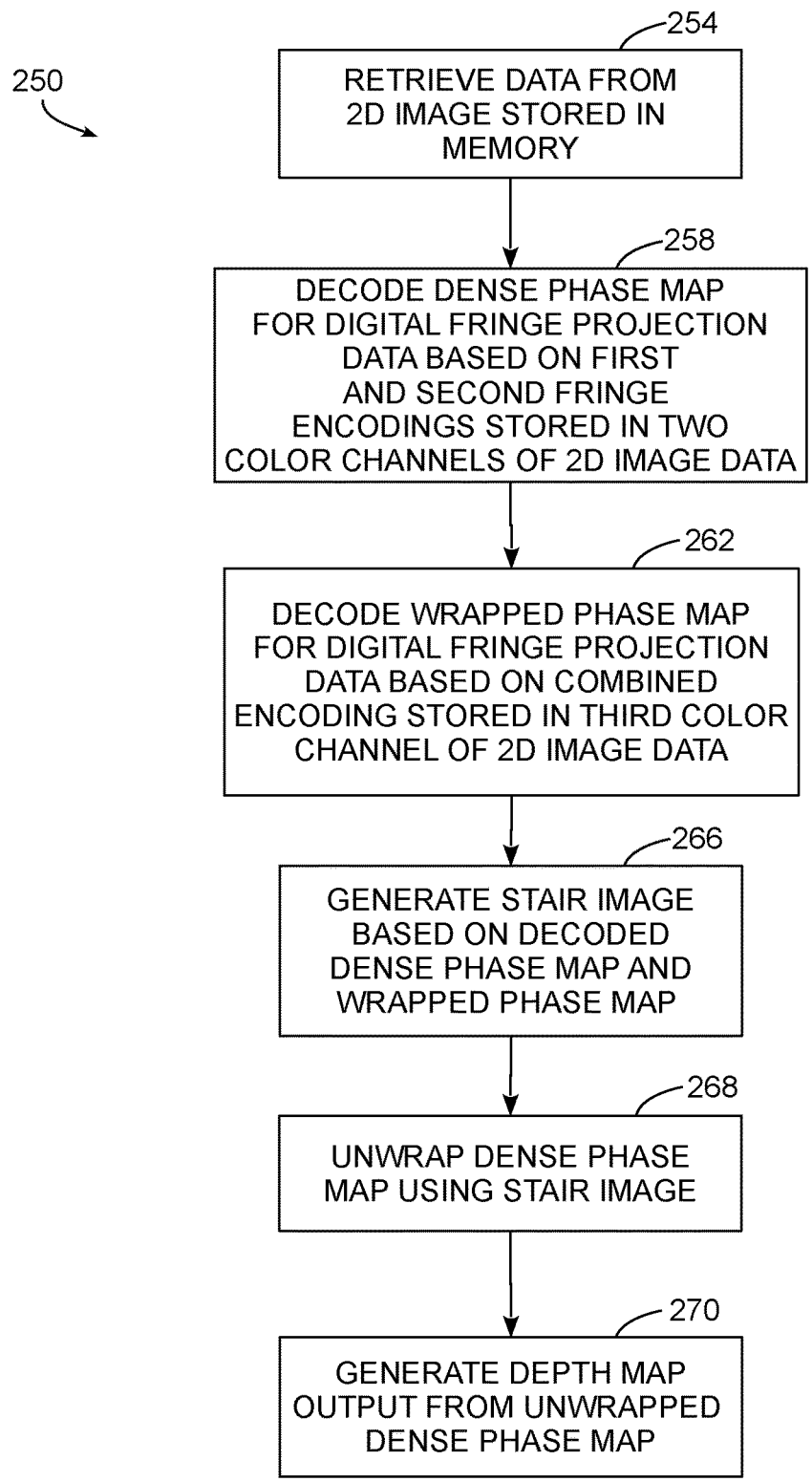
FIG. 2B is a block diagram of a process for decoding the multi-wavelength encoded data that are generated during the process of FIG. 2A.

FIG. 2B depicts a decoding process 250 that enables decoding of the encoded depth information data that the system 100 generates during the process 200. In the description of process 250, a reference to the process performing a function or task refers to the execution of stored program instructions by a processor in an image processing system to perform the function or action. The process 250 is described in conjunction with the system 100 of FIG. 1 for illustrative purposes.

The process 250 begins as the processor 128 retrieves data that are stored in the two-dimensional image from the memory (block 254). In the system 100, the processor 128 retrieves the encoded image data 140 from the memory 132. In embodiments where the encoded image data are stored in a compressed format, the processor 128 also performs a decompression process to retrieve the two-dimensional image data with multiple color channels that store the encoded DFP information.

Process 250 continues as the processor 128 decodes a dense phase map from the encoded DFP data corresponding to the first and second fringe encodings that are stored in two color channels (e.g. the red and blue color channels) of the two-dimensional image data (block 258). In the system 100, the processor 128 initiates decoding of the retrieved DFP data using the following arctangent function:

$$\phi_{rb}(i, j) = \tan^{-1}\left(\frac{I_r(i, j) - 0.5}{I_b(i, j) - 0.5}\right)$$

In the function above, $I_r$ (i, j) represents the red-channel component data in a pixel at coordinates (i, j) that corresponds to the first encoded DFP data generated during the process 200. Similarly, $I_b$ (i, j) represents the blue-channel component data in a pixel at coordinates (i, j) that corresponds to the second encoded DFP data generated during the process 200, although as mentioned above the precise color channel assignments for each set of encoded DFP data may vary between embodiments of the processes 200 and 250. The element $\phi_{rb}$ is also referred to as a "dense" phase map since this element is based on the first and second encoded elements from the original DFP data. The processor 128 performs the same function for each of the pixels in the two-dimensional image data to generate a two-dimensional dense phase map based on the image data.

During the process 250, the processor 128 also decodes a wrapped phase map from the color channel of each pixel in the image data that stores the combined encoded DFP data, such as the green color channel in the illustrative embodiments of FIG. 2A and FIG. 2B (block 262). The processor 128 retrieves the wrapped phase map data using the following function:

$$\phi_g(i,j) = I_g(i,j)(2\pi) - \pi$$

In the function above, $I_g$ (i, j) is the green channel value for a pixel at coordinates i, j in the two-dimensional image. The equation above also includes the multiplication by $2\pi$ and subtraction by $\pi$ to remap the numeric values that the processor 128 retrieves from the image data from a range of (0, 1] to a range of phases in a numeric range of $(-\pi, \pi]$. The processor 128 performs the same function for each of the pixels in the two-dimensional image data to generate a two-dimensional wrapped phase map based on the image data.

The process 250 continues as the processor 128 generates a "stair" image, which is a two-dimensional image with pixel values that are generated based on both the extracted dense phase map and wrapped phase map data (block 266). The "stair" image is so named because the image includes a finite number of depth levels for different pixels just as a staircase has a finite number of steps, although of course the arrangement of pixels in the image represent the structures of objects with a wide range of shapes. The processor 128 generates the stair image using the following function:

$$K(i, j) = \frac{\left(\phi_g(i, j) \times \frac{\text{Range}(Z)}{P}\right) - \phi_{rb}(i, j)}{2\pi}$$

In the equation above, K(i, j) represents the value of a pixel in the stair image at coordinates (i, j) based on the corresponding wrapped phase map value $P_g$ (i, j) and dense phase map value $\phi_{rb}$(i, j) for the same coordinates. The Range(Z) and P values are the same maximum Z wavelength range and predetermined shorter wavelength values, respectively, that were used in the encoding process 200 that generated the encoded DFP data.

In the process 250, the processor 128 unwraps the dense phase map using the stair image to obtain an unwrapped phase map (block 268). The unwrapping process uses each element of K(i, j) in the stair image to determine the scale of how many phase periods (represented numerically as $2\pi$ radians per period) must be added to each corresponding element $\phi_{rb}$(i, j) in the dense phase map to remove the $2\pi$ discontinuities from the stored dense phase map data. Removing the phase jumps produces a continuous, unwrapped phase map, $\Phi$, of the shorter wavelength P.

The process 250 continues as the processor 128 generates an output depth map based on the unwrapped phase map (block 270). The output depth map is another two-dimensional arrangement of pixels in which the coordinates (i, j) correspond to the x and y axis locations, respectively, of different features on the object and the numeric value of each element in the depth map corresponds to the z-axis depth location of the surface of the object at each location. The processor 128 generates the output depth map Z as a two-dimensional image that corresponds to the three-dimensional structure of the object as viewed from one viewing position using the following functions, where $\Phi$(i, j) is the unwrapped phase map described above and Round represents a numeric rounding function:

$$\Phi(i, j) = \phi_{rb}(i, j) + 2\pi \times \text{Round}(K(i, j))$$

$$Z(i, j) = \frac{\Phi(i, j) \times P}{2\pi}$$

As described above, the system 100 or another suitable computing device generates output based on the depth map to enable a wide range of useful applications. Examples of applications that use to the structure of the depth map include, but are not limited to, computer aided design and modeling (CAD/CAM) applications, building and vehicle inspections, forensic sciences, entertainment, 3D video telepresence, virtual and augmented reality applications, and the like. Because most of 3D imaging devices inherently use 2D sensor to capture 2D images and recover depth information from 2D images, and thus the depth information is critical for the majority of 3D imaging technologies.

Figure 4:
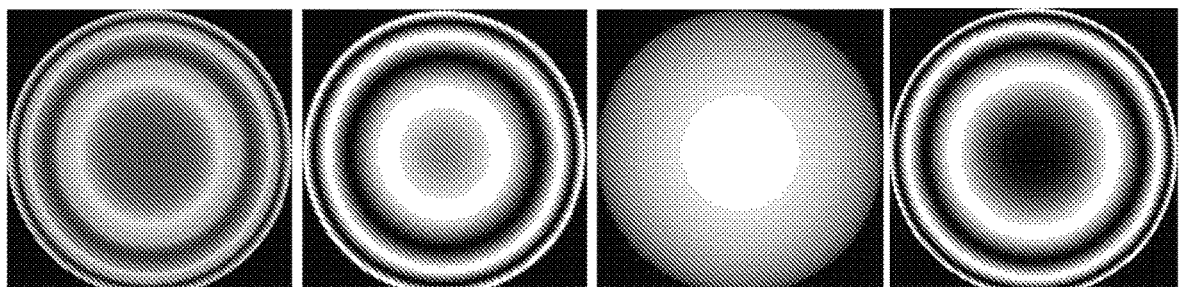
FIG. 4 is a diagram depicting a set of fringe patterns and other image data that are generated during the processes of FIG. 2A and FIG. 2B.
Figure 4:
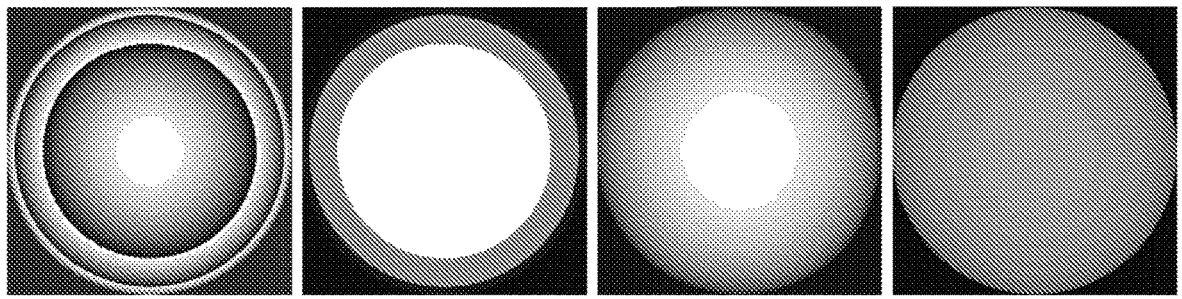

FIG. 4-FIG. 9 depict elements of the processes 200 and 250 that are described above. FIG. 4 depicts shows each channel and step along the multi-wavelength encoding and decoding processes. FIG. 4 shows the compressed, encoded 2D color image (a). In FIG. 4, images (b)-(d) depict the individual red, green, and blue color channels of the image, respectively. To recover geometry from encoded image data, the processor 128 uses the dense phase corresponding to the fringe images of the shorter wavelength, and FIG. 4 depicts the resulting dense phase image (e). As described previously, the continuous, wrapped phase of the longer wavelength as depicted in image (c) of FIG. 4 forms a basis to generate the stair image (f) of FIG. 4. As described above, the processor uses the stair image data to unwrap the phase of the shorter wavelength to generate the unwrapped phase map (g) in FIG. 4, which in turn forms the basis for the depth map (h) that corresponds to the three-dimensional structure of the object.

Figure 5:
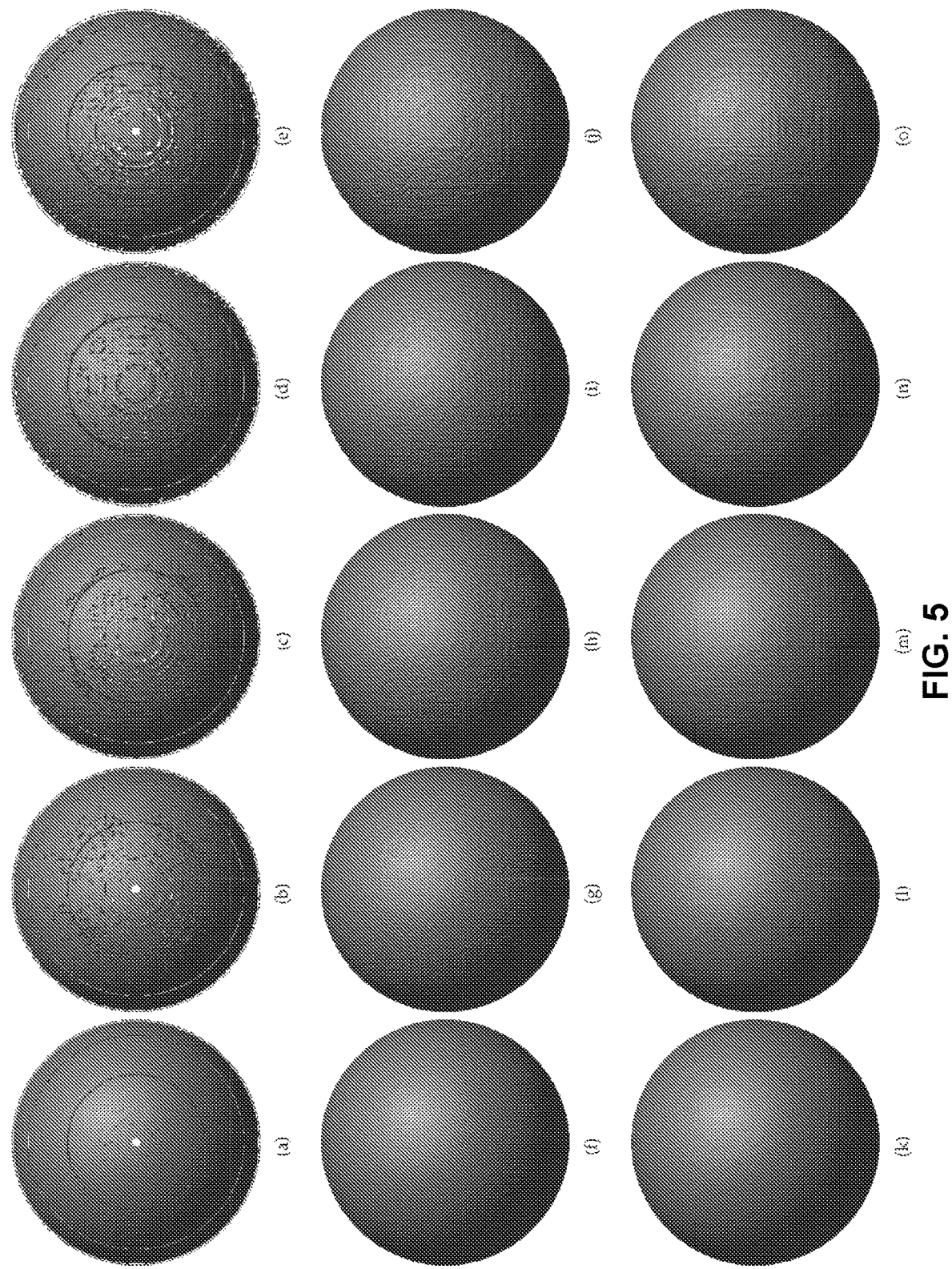
FIG. 5 is a diagram depicting image quality of depth maps that are generated as two-dimensional images with prior art techniques and the processes of FIG. 2A and FIG. 2B.

FIG. 5 depicts a visual comparison of the decoded depth information for a three-dimensional sphere object based on the processes 200 and 250 in a system that uses a lossy JPEG compression format to compress the two-dimensional image data generated during the process 200. Each column in FIG. 5 Each column represents JPEG storage levels 100%, 80%, 60%, 40%, and 20%, respectively, using a commercially available JPEG compression engine. Row 1 (items a-e) depicts the results of a prior art direct depth method without a filter applied to the recovered geometry; Row 2 (items f-j) depicts the prior art direct depth method with a 25×25 filter applied to the recovered geometry; and Row 3 (items k-o) depicts the multi-wavelength depth techniques that are taught herein without any filter applied. As depicted in FIG. 5, even without the use of a filter the techniques taught herein produce high quality results. In particular, the multi-wavelength encoding and decoding techniques taught herein produce high quality results in configurations that employ high levels of lossy compression where the prior art techniques experience much larger degradations in image quality.

Table 1 presents a comparison of the quality of results of the multi-wavelength encoding/decoding (MWD) processes of FIG. 2A and FIG. 2B compared to two versions of a prior-art "direct depth" encoding process (DD) in a system that uses a lossless compression format such as portable network graphics (PNG) or a lossy compression format such as a JPEG compression format at varying quality levels from highest quality (100) to lowest quality (20). The quality metric in Table 1 is the percentage of root mean square (RMS) error between the original encoded data and the decoded data for the sphere structure that is depicted in FIG. 5:

TABLE 1

|  | PNG (%) | JPG100 (%) | JPG80 (%) | JPG60 (%) | JPG40 (%) | JPG20 (%) |
| --- | --- | --- | --- | --- | --- | --- |
| DD No Filter | 0.0061 | 2.9557 | 3.4834 | 3.3970 | 3.8545 | 4.5275 |
| DD 25 × 25 Filter | 0.0061 | 0.0263 | 0.0438 | 0.0578 | 0.0725 | 0.0924 |
| MWD No Filter | 0.0061 | 0.0167 | 0.0271 | 0.0508 | 0.0651 | 0.0928 |

As depicted in Table 1, the MWD processes that are taught in this document produce quality levels that are equivalent to the prior art in lossless compression situations (PNG) and that are comparable to or significantly better than the prior art in the lossy JPEG scenarios. In particular, while the prior art DD process with the use of an additional 25×25 filter sometimes produces results with similar accuracy levels to the MWD processes taught herein, the MWD processes do not require the use of additional filters to achieve the high quality results, which reduces the complexity of the encoding and decoding MWD processes compared to the prior art.

Figure 6:
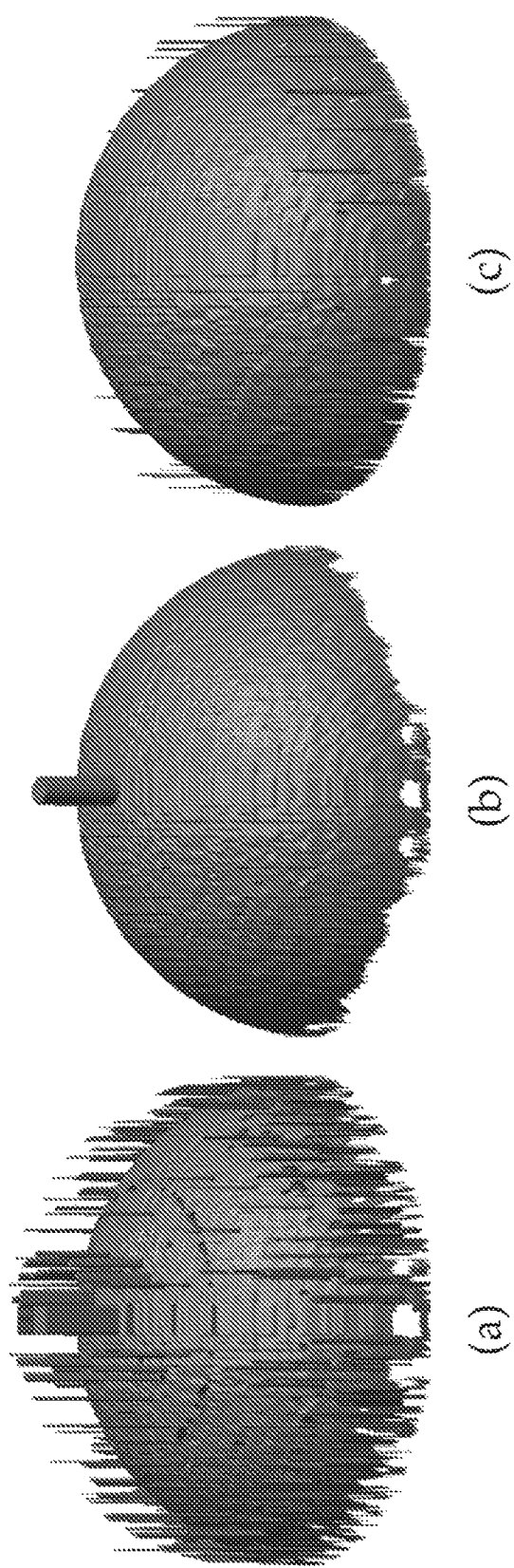
FIG. 6 is another diagram depicting image quality of depth maps that are generated as two-dimensional images with prior art techniques and the processes of FIG. 2A and FIG. 2B.

In some instances, a small filter can be used to further improve the results of the processes 200 and 250 when using lossy compression. FIG. 6 depicts an example of errors in 3D image data that are generated using prior art techniques (drawings (a) and (b)) compared to the MWD processes that are described herein (drawing (c)). FIG. 6 depicts the recovered data for a hemispherical three-dimensional object. Drawing (a) depicts the prior art (a) 3D recovery from an image generated using the direct depth (DD) process and a JPEG 10% compressed image with a small 5×5 filter. Drawing (b) depicts the same object recovered from an image generated using the DD process and the JPEG 10% compressed image with a larger 25×25 filter. Drawing (c), however, depicts the results from the MWD encoding and decoding processes of FIG. 2A and FIG. 2B us with the JPEG 10% compression level and only a small 5×5 filter. As seen qualitatively, the hemisphere in drawing (c) is much more accurate than in drawings (a) and (b). Quantitatively, drawings (a) and (b) generated using the prior-art techniques produce RMS errors of 6.13% and 3.93%, respectively, while drawing (c) that corresponds to an image generated using the processes described herein has an RMS error of only 0.15%.

Figure 7:
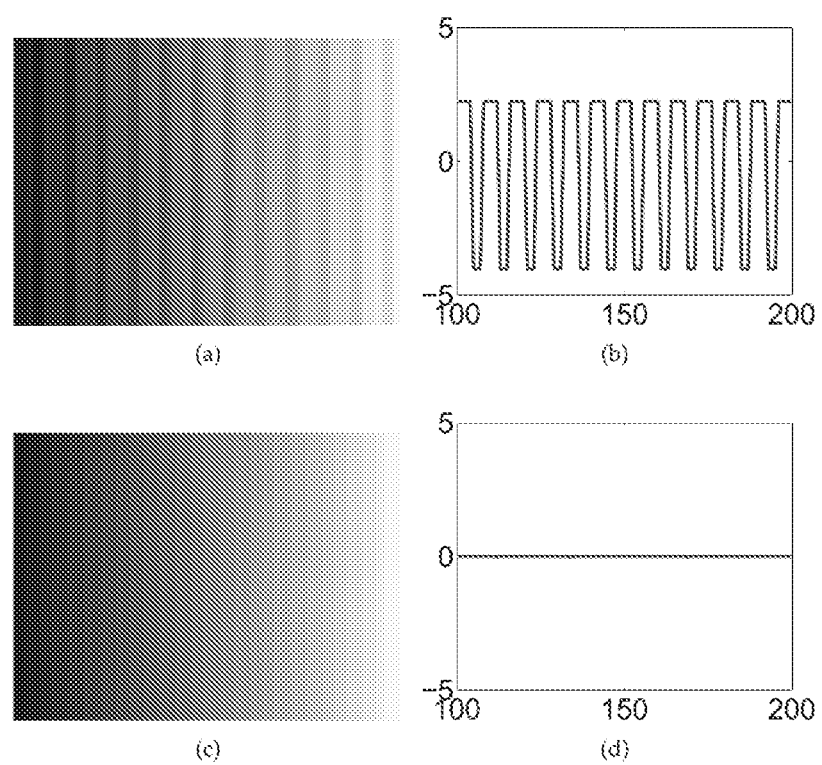
FIG. 7 is a diagram depicting errors generated in a phase map of a prior art direct depth encoding and decoding process when generating depth data for a high-resolution surface compared to a phase map generated by the processes of FIG. 2A and FIG. 2B.

FIG. 7 depicts another example of the inability of the prior art DD technique to generate accurate depictions of high-resolution smooth transitions in depth for the structure of a three-dimensional object, while the MWD techniques taught herein enable encoding and decoding of high-resolution depth data. In FIG. 7, diagram (a) is a normalized subwindow of the recovered phase when using the prior art direct depth technique to encode geometry with a depth resolution of 1,024 and 128 stairs. Diagram (b) is a cross section of the recovered phase from (a) with the slope removed and the resulting 2π-tall spikes leave artifacts within the data for the prior art direct depth technique. In FIG. 7, diagram (c) depicts the normalized subwindow of recovered phase when using the MWD technique described herein to encode the same geometry with the same number of stairs; (d) cross section of the recovered phase (c) with the slope removed, which clearly produces a more accurate representation of the smooth depth transition of the three-dimensional object.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A non-transient computer readable medium containing computer executable instructions which are configured to, when executed by a processor:
   generate a first fringe encoding and a second fringe encoding for a first predetermined wavelength based on a Digital Fringe Projection (DFP) data of a three-dimensional structure at a first coordinate;
   generate a third fringe encoding and a fourth fringe encoding for a second wavelength based on the DFP data at the first coordinate, the second wavelength being longer than the first wavelength;
   generate a combined fringe encoding based on the third fringe encoding and the fourth fringe encoding; and
   store the first fringe encoding data, the second fringe encoding data, and the combined fringe encoding data in a pixel of two-dimensional image data at a pixel coordinate in the two-dimensional image data corresponding to the first coordinate, the two-dimensional image data being stored in a memory.

2. The computer readable medium of claim 1, wherein the computer executable instructions are further configured to, when executed by the processor:
store the first fringe encoding data in a first color channel of the pixel, the second fringe encoding data in a second color channel of the pixel, and the combined fringe encoding data in a third color channel of the pixel.

3. The computer readable medium of claim 1, wherein the computer executable instructions are further configured to, when executed by the processor:
compress the two-dimensional image data prior to storing the two-dimensional image data in the memory.

4. The computer readable medium of claim 3, wherein the computer executable instructions are further configured to, when executed by the processor:
compress the two-dimensional image data using a lossy compression format.

5. The computer readable medium of claim 3, wherein the computer executable instructions are further configured to, when executed by the processor:
compress the two-dimensional image data using a lossless compression format.

6. The computer readable medium of claim 1, wherein the computer executable instructions are further configured to, when executed by the processor:
generate the first fringe encoding based, at least in part, on a sine function value of a proportion of the second wavelength divided by the first predetermined wavelength; and
generate the second fringe encoding based, at least in part, on a cosine function value of the proportion of the second wavelength divided by the first predetermined wavelength.

7. The computer readable medium of claim 1, wherein the computer executable instructions are further configured to, when executed by the processor:
generate the third fringe encoding based, at least in part, on a sine function value of a proportion of the second wavelength divided by a maximum range of wavelengths present in the DFP data; and
generate the fourth fringe encoding based, at least in part, on a cosine function value of the proportion of the second wavelength divided by a maximum range of wavelengths present in the DFP data.

8. The computer readable medium of claim 7, wherein the computer executable instructions are further configured to, when executed by the processor:
generate, with the processor, the combined fringe encoding based, at least in part, on an arctangent of a proportion of the third fringe encoding divided by the fourth fringe encoding.

9. A non-transient computer readable medium containing computer executable instructions which, when executed by a processor, decode encoded digital fringe projection (DFP) data corresponding to a physical object by:
retrieving a first pixel of two-dimensional image data;
decoding a plurality of phase data stored in a plurality of color channels of the first pixel;
generating a stair image including a second pixel corresponding to the first pixel of the two-dimensional image data based on the plurality of phase data; and
generating a depth map including a third pixel corresponding to the second pixel of the stair image, the third pixel storing data corresponding to a depth of a location of the physical object.

10. The computer readable medium of claim 9, wherein the computer executable instructions are further configured to, when executed by the processor, decode the encoded DFP data corresponding to a physical object wherein the plurality of phase data comprises dense phase data and wrapped phase data.

11. The computer readable medium of claim 10, wherein the computer executable instructions are further configured to, when executed by the processor,
decode the dense phase data based, at least in part, on an arctangent of a proportion of a first fringe encoding stored in a first color channel of the first pixel divided by a second fringe encoding stored in a second color channel of the first pixel.

12. The computer readable medium of claim 10, wherein the computer executable instructions are further configured to, when executed by the processor,
retrieve the wrapped phase data from a third color channel of the first pixel; and
scale the wrapped phase data from a first numeric scale to a second numeric scale with a range of values from $[-\pi, \pi)$.

13. The computer readable medium of claim 10, wherein the computer executable instructions are further configured to, when executed by the processor,
generate the second pixel corresponding to the first pixel of the two-dimensional image data based, at least in part, on the wrapped phase data subtracted from a product of the dense phase data multiplied by a proportion of a maximum range of wavelengths present in the encoded DFP data divided by a predetermined wavelength that was used to generate the encoded dense phase data stored in the pixel, the predetermined wavelength being smaller than the maximum range of wavelengths.

14. The computer readable medium of claim 13, wherein the computer executable instructions are further configured to, when executed by the processor,
generate the third pixel corresponding to the second pixel based, at least in part, on a sum of the dense phase data added to the second pixel of the stair image function multiplied by the predetermined wavelength.

15. A method for generating encoded depth data comprising:
generating, with the processor, a plurality of fringe encoding values based on a Digital Fringe Projection (DFP) data of a three-dimensional structure at a first coordinate; and
storing, with the processor, the plurality of fringe encoding values in a plurality of color channels of a pixel of two-dimensional image data at a pixel coordinate in the two-dimensional image data corresponding to the first coordinate, the two-dimensional image data being stored in a memory.

16. The method of claim 15, wherein generating the plurality of fringe encoding values further comprises:
generating a first fringe encoding and a second fringe encoding for a first predetermined wavelength based on the DFP data at the first coordinate; and
generating a third fringe encoding and a fourth fringe encoding for a second wavelength based on the DFP data at the first coordinate, the second wavelength being longer than the first wavelength.

17. The method of claim 16, wherein generating the plurality of fringe encoding values further comprises:
generating a combined fringe encoding based on the third fringe encoding and the fourth fringe encoding.

18. The method of claim data 16, wherein storing the plurality of fringe encoding values further comprises:
    storing the first fringe encoding data in a first color channel of the pixel, the second fringe encoding data in a second color channel of the pixel, and information based on the third encoding data and the fourth encoding value in a third color channel of the pixel.

19. The method of claim 15, the compressing further comprising:
    compressing, with the processor, the two-dimensional image data using a lossy compression format.

20. The method of claim 15, further comprising:
    compressing, with the processor, the two-dimensional image data using a lossless compression format.

* * * * *